Patented Nov. 30, 1948

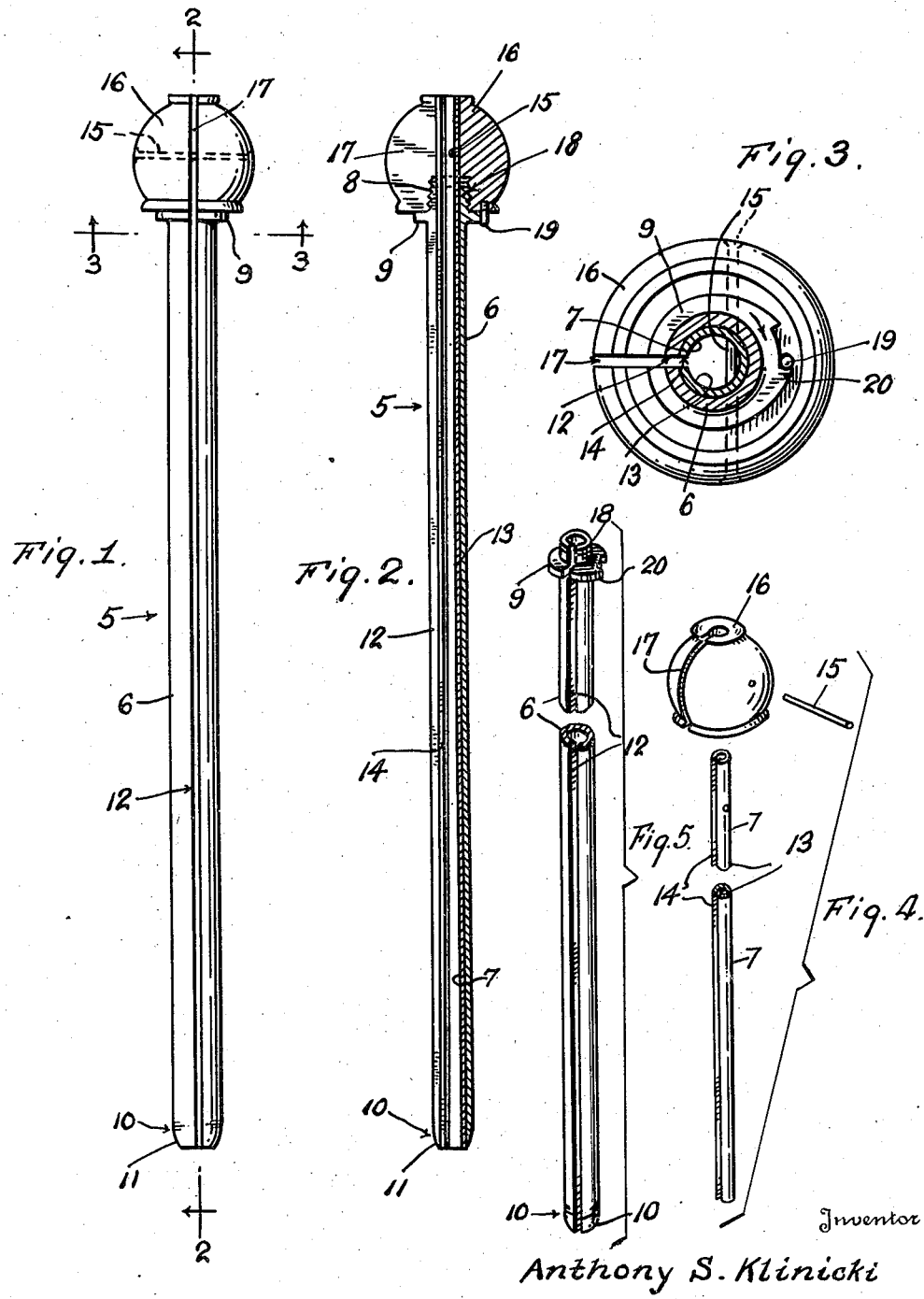

2,455,013

UNITED STATES PATENT OFFICE 2,455,013

FISH HOOK REMOVER

Anthony S. Klinicki, Detroit, Mich.

Application January 28, 1947, Serial No. 724,908

1 Claim. (Cl. 43—29)

This invention relates to fishing and trapping and more particularly to fish hook removers.

The primary object of this invention resides in the provision of a fish hook remover adapted to easily dislodge fish hooks from the mouths of fish without catching the hooks in the individual's fingers or tearing the flesh of the fish.

Another object of this invention resides in the provision of a fish hook remover adapted to be disposed on that portion of a fishing line adjacent the hook thereon so it can be pushed into the mouth of a caught fish against the hook to free it.

A further object of this invention resides in the particular construction of the fish hook remover.

A still further object of this invention resides in the combination of the inner and outer tubes of the fish hook remover.

With these and other objects in view, this invention resides in certain novel features of construction and arrangement of elements to be hereinafter more particularly set forth in the specification, illustrated in the accompanying drawing and pointed out in the appended claim and, although this disclosure depicts my present conception of the invention, the right is reserved to resort to such departures therefrom as come within the spirit of the invention.

In the accompanying drawing forming a part of this application:

Fig. 1 is a side view of the fish hook remover.

Fig. 2 is a longitudinal sectional view taken approximately on line 2—2 of Fig. 1.

Fig. 3 is a cross sectional view taken approximately on line 3—3 of Fig. 1.

Fig. 4 is a perspective view of the inner tube and knob in juxtaposition.

Fig. 5 is a similar view of the outer tube of the fish hook remover.

In the present embodiment of this invention, the numeral 5 designates, in general, a fish hook remover consisting of an elongated outer tube 6 having its inner end 7 provided with screw-threads 8 disposed inwardly of an annular shoulder 9 and its outer end 10 bevelled as indicated by the numeral 11. Said outer tube 6, including the collar 9 and threaded portion 8, is provided with a slit 12 throughout its length.

Axially disposed within the outer tube 6 and extending beyond the inner end 7 thereof is an inner tube 13 having a slit 14 extending through its length.

Secured on that portion of the inner tube which extends inwardly from the inner end of the outer tube as by a pin 15 is a knob 16 having a slit 17 therein registering with the slit 14 in said inner tube. Said knob is provided with internal screw-threads 18 adapted to engage the screw threads 8 of the outer tube and, in order to limit rotation of the inner tube within the outer tube to cause the slits therein to register for disposing the remover on a fish line, a stop-pin 19, extending from the outer end of the knob, engages a shoulder 20 formed in the aforesaid collar. Said stop-pin limits rotation of the inner tube within the outer tube sufficiently to cause registering of the slits therein by slight movement of the knob so the remover can be quickly disposed on a fishing line and thereafter prevent accidental dislodgement therefrom as it is pushed into the mouth of a caught fish.

In order to dispose the fish hook remover on a fishing line subsequent to catching a fish on the hook thereof, the inner tube 7 is rotated in one direction within the outer tube 6 by the knob 16 until the slots 12, 14 and 17 register with one-another, whereupon the fish hook remover is slidably disposed over a portion of the fishing line and retained thereon by rotating the inner tube 7 in the reverse direction by said knob. With the upper portion of the fishing line wrapped around a finger of the fisherman's right hand and held taut therebetween and a fish on the hook, the remover is gently pushed into the mouth of the fish against the hook until the hook becomes dislodged from the mouth of the fish whereupon the hook is tightly held against the outer end of the outer tube until in a safe position to again cause the slots to register and permit the fishing line to pass therethrough.

With this invention fully set forth, it is manifest that a fish hook remover is provided which will readily dislodge fish hooks from the mouths of fish without injury to the fisherman and through the simplicity of construction thereof, positive operation of the same is assured.

Having thus described my invention, what I claim and desire to protect by Letters Patent is:

In a fish hook remover comprising, an elongated outer tube including a collar adjacent its inner end and having a longitudinal slit extending therethrough and its outer end bevelled and its inner end threaded, an elongated slit inner tube rotatably disposed in the outer tube with its slit registrable with the slit in the outer tube and its inner end extending beyond the threaded end of the outer tube, a knob threaded on the threaded end of the outer tube and having a slit therein registering with the slits in the inner and outer tubes, a pin securing the knob on the inner end of the inner tube, a shoulder formed on the periphery of said collar, and a stop-pin secured to the lower surface of said knob in the path of said shoulder to limit rotation of the inner tube within the outer tube when the aforesaid slits are in registered relation.

ANTHONY S. KLINICKI.

REFERENCES CITED

The following references are of record in the file of this patent:

FOREIGN PATENTS

| Number | Country | Date |
|--------|---------|------|
| 586,925 | Germany | Oct. 27, 1933 |